Oct. 16, 1951  D. E. HOOKER  2,571,243
COIL WINDING MACHINE
Filed March 22, 1945  10 Sheets-Sheet 1
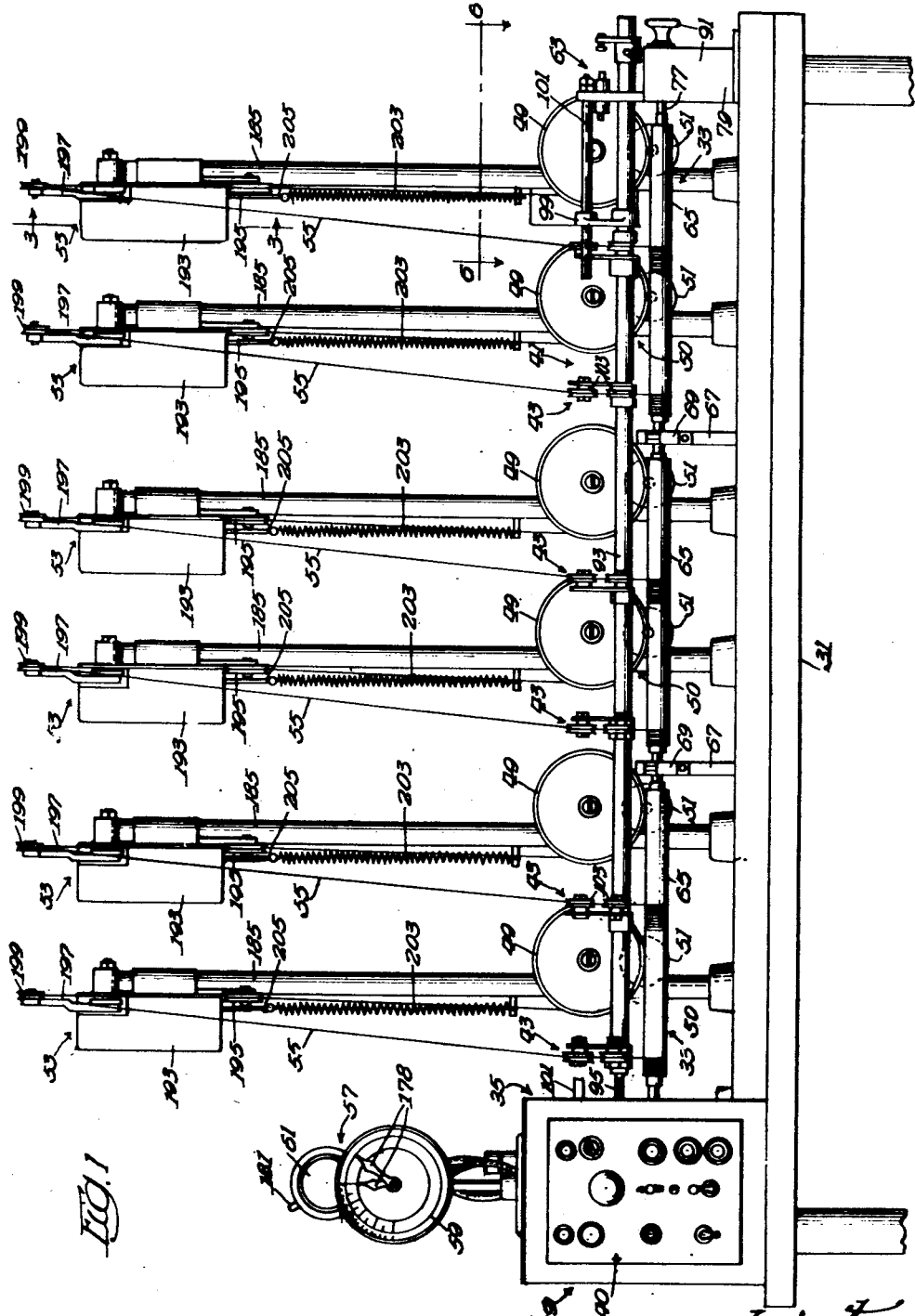
Inventor
Donald E. Hooker
By: Spencer, Margell, Johnston & Cook

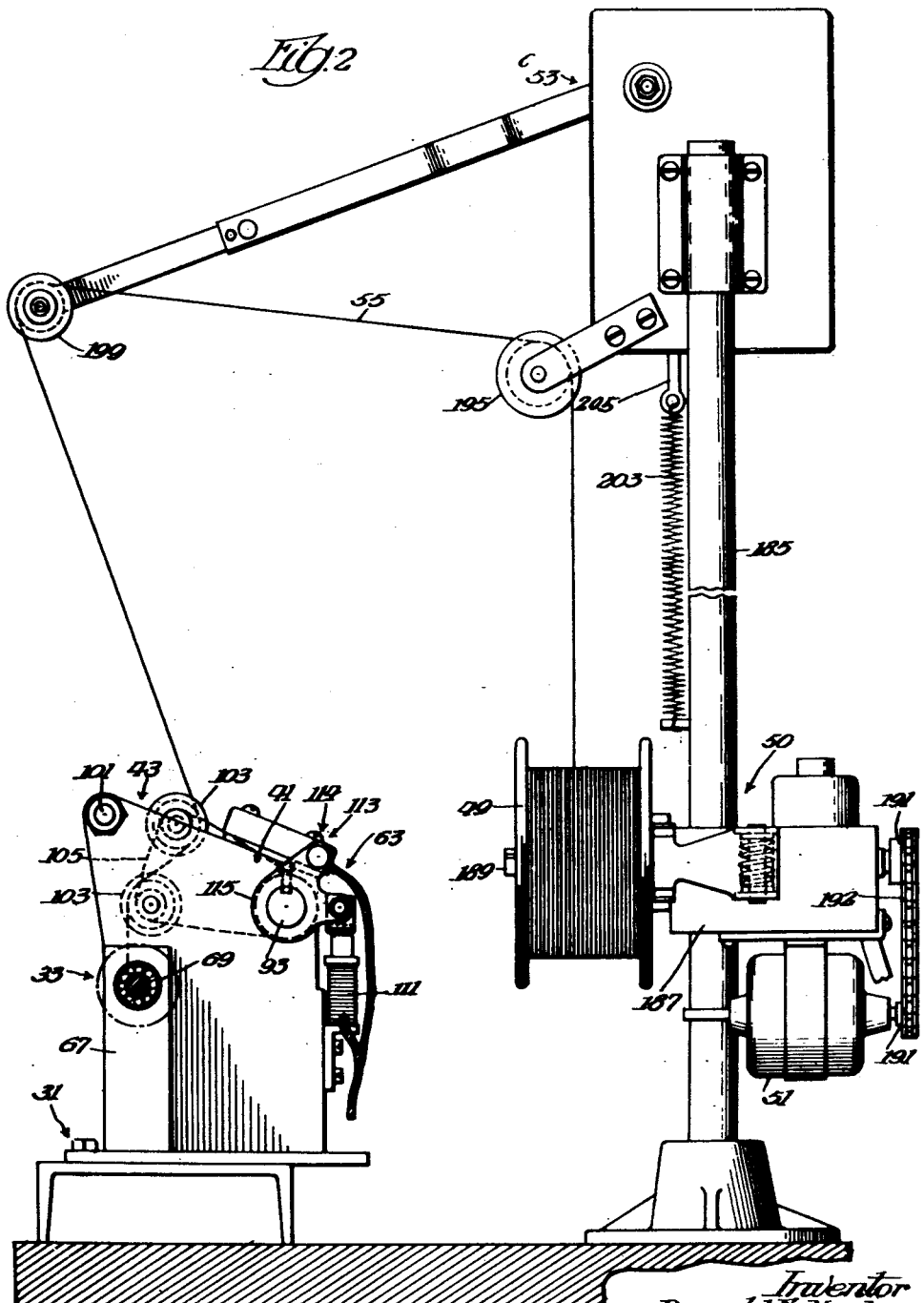

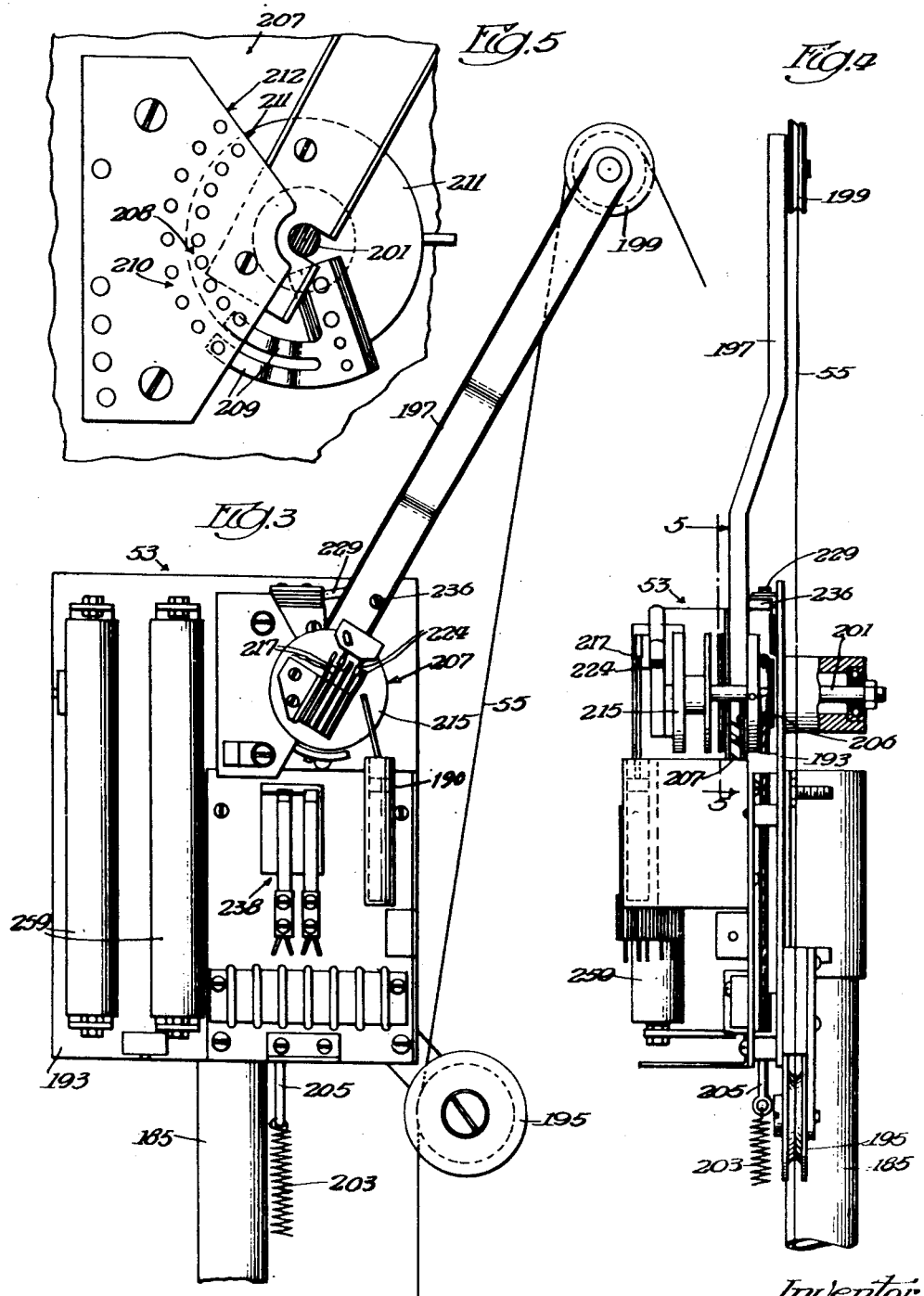

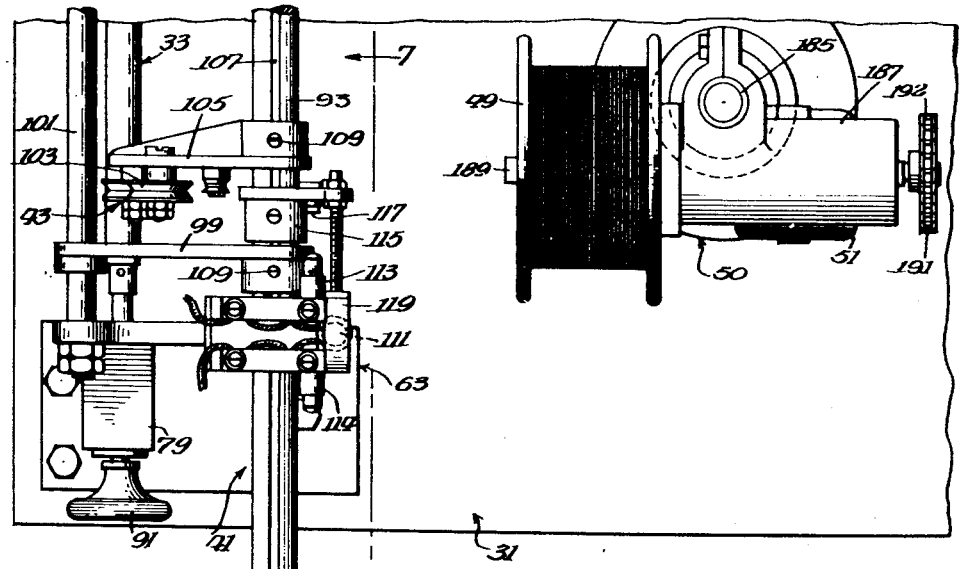
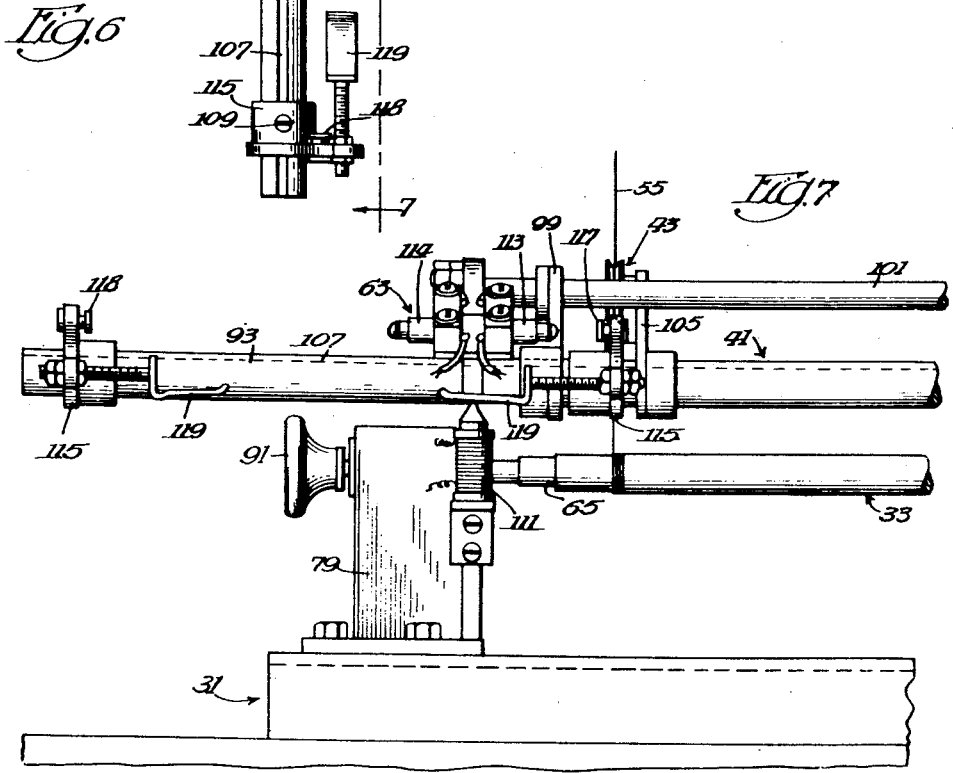

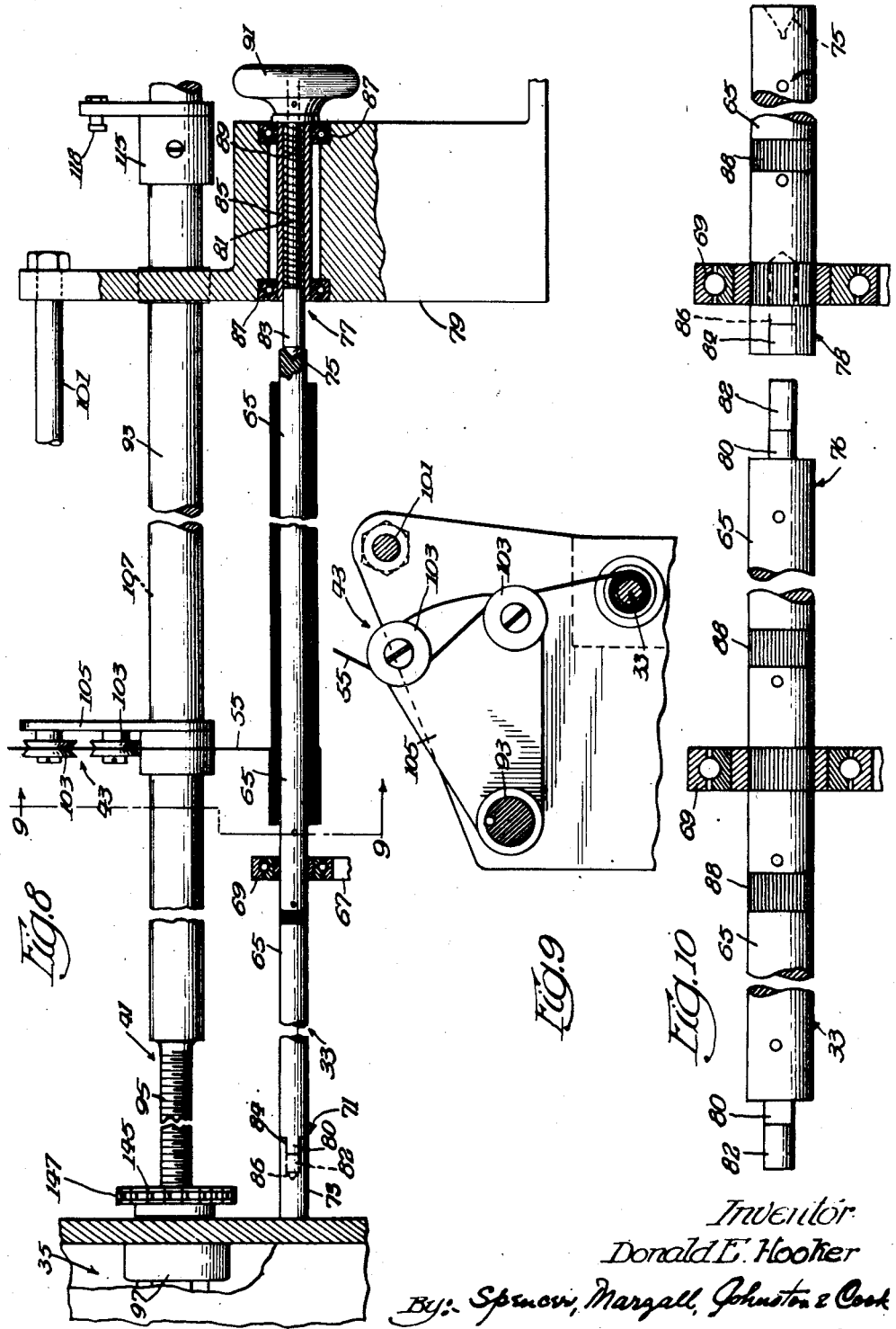

Inventor
Donald E. Hooker

Oct. 16, 1951     D. E. HOOKER     2,571,243
COIL WINDING MACHINE
Filed March 22, 1945

Inventor:
Donald E. Hooker
By Spencer, Marzall, Johnston & Cook
Attys

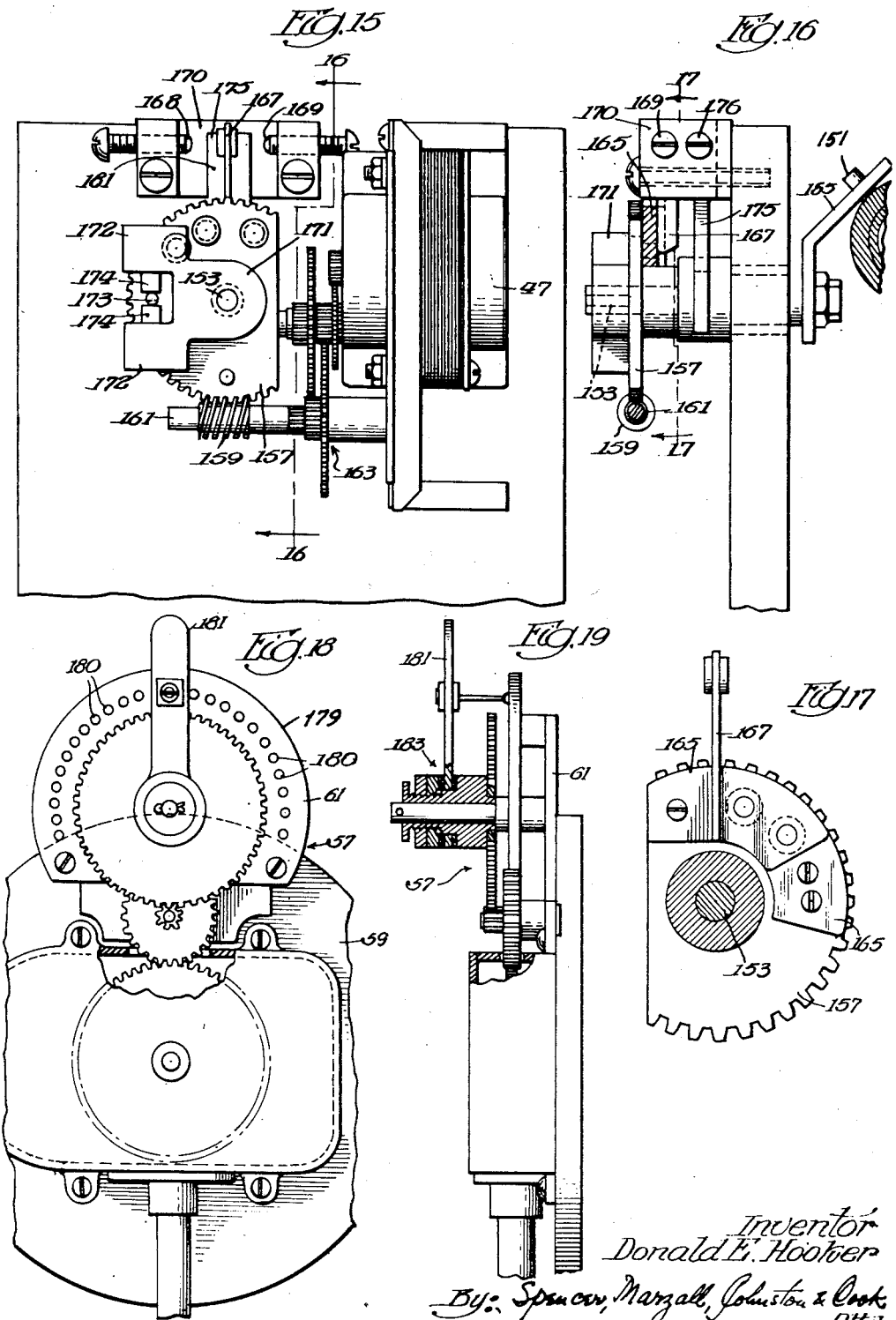

Oct. 16, 1951  D. E. HOOKER  2,571,243
COIL WINDING MACHINE
Filed March 22, 1945  10 Sheets-Sheet 9

Inventor:
Donald E. Hooker
By: Spencer, Margall, Johnston & Cook
Attys

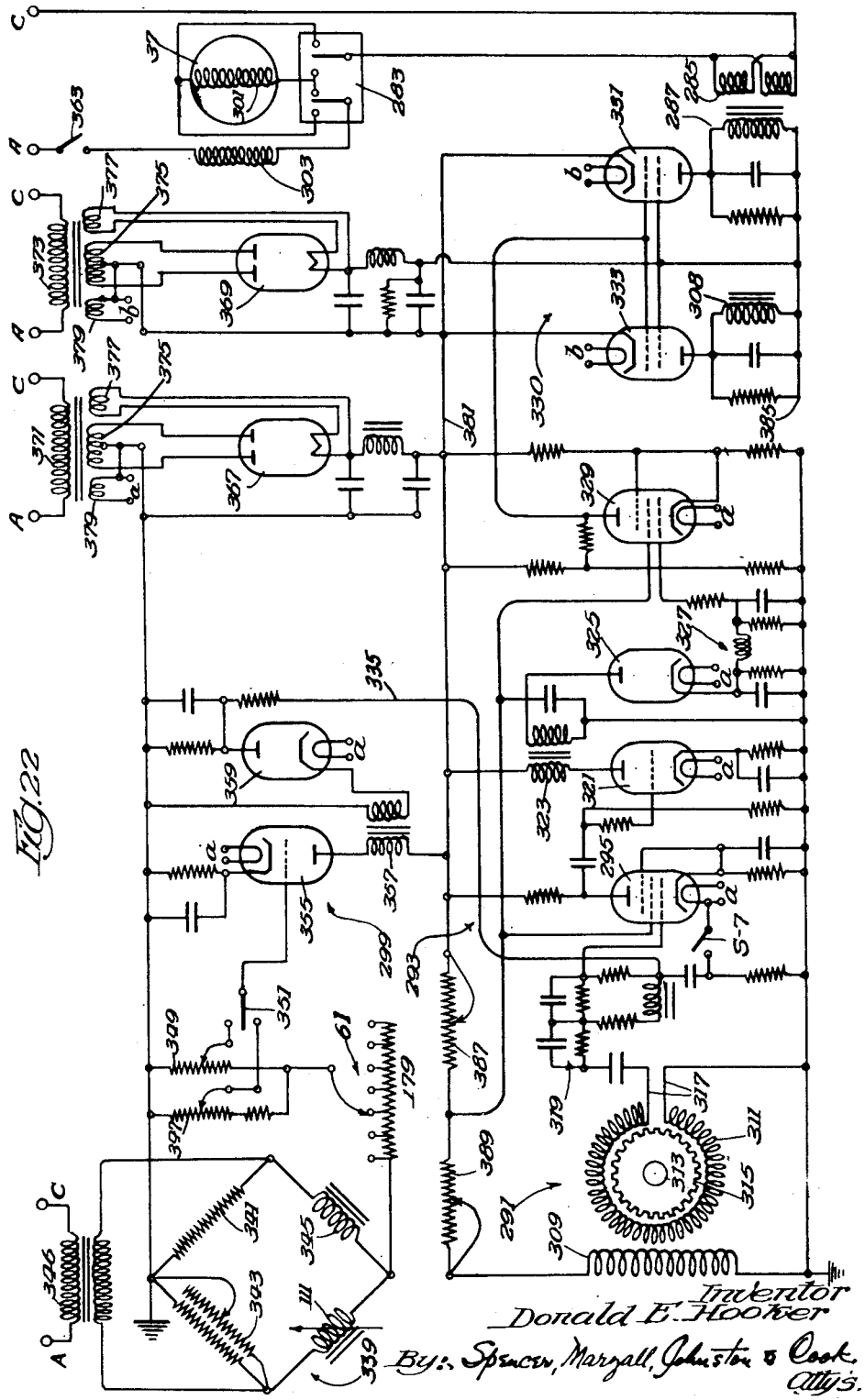

Patented Oct. 16, 1951

2,571,243

UNITED STATES PATENT OFFICE 2,571,243

COIL WINDING MACHINE

Donald E. Hooker, Chicago, Ill., assignor to Lion Manufacturing Corporation, Chicago, Ill., a corporation of Illinois Application March 22, 1945, Serial No. 584,078

15 Claims. (Cl. 242—9)

The present invention relates in general to winding and reeling flexible material, and has more particular reference to means for and methods of winding flexible material on tubes, spools, mandrels and the like.

An important object of the invention is to provide for the winding of flexible material, such as wire, on suitable support means, such as spools, tubes and the like, at a high rate of speed, to thereby produce electrical coils at low cost; a further object being to provide for the winding of relatively weak filamentary material at a high rate of speed, whereby electrical coils composed of fine gauge wire may be produced rapidly and efficiently, with the wire positioned accurately in the finished coil both as to spacement of the adjacent coil turns and the number of turns in a wound coil layer.

Another important object is to provide means for delivering flexible material for winding at all times under substantially uniform tension regardless of winding speed or variations in the winding speed; a further object being to provide delivery means capable of retracting or rewinding the flexible material, under predetermined uniform tension, in the event that the winding operation be reversed either accidentally or intentionally, the foregoing feature being valuable in a coil winding machine wherein the facility for unwinding a coil, rapidly and to any desired extent, is extremely useful in allowing for the correction of defects or winding errors noted during the fabrication of the coil.

Another important object is to provide delivery mechanism having means for regulating the linear speed of flexible material delivered from a motor driven supply spool; a further object being to provide an improved wire delivery mechanism including a motor driven supply spool adapted to feed wire therefrom and to rewind wire thereon under substantially constant tension, thereby to eliminate breakage of the wire and to keep the wire sufficiently taut, at all times, to insure even winding and to prevent snarling or tangling of the wire either during delivery or while rewinding.

Another object is to provide anti-hunting control means for the delivery mechanism so that the same may perform its delivery function in a smooth, uniform manner without constantly searching for the proper delivery speed in response to slight variations in operating conditions of the apparatus.

Another important object is to provide a coil winding machine for applying wire or similar flexible material, in layers, on a spool or the like, including means uniformly and automatically increasing and decreasing winding speed respectively at the beginning and at the end of a layer winding cycle, whereby the major portion of the layer may be wound at maximum speed while avoiding breakage of the flexible material especially during the initial and terminal portions of the layer winding operation.

Another important object is to provide, in a high speed winding machine, means for accurately determining the number of turns applied by the machine in forming a wound layer; a further object being to provide means whereby the machine may be "inched" during its layer winding cycle in order to apply an exact number of turns in a wound layer.

Another object is to provide a winding machine for winding a plurality of coils upon a common winding mandrel, the number of coils that may be wound simultaneously in machines embodying the present invention being limited only by the number of winding stations in a particular machine, and the capacity of the power plant which drives the same.

Another object is the provision, in a multiple coil winding machine, of a sectional mandrel adapted to support one or more winding spools or tubes on each section, the several sections being demountable to permit initial assembly of the spools on, and final removal thereof from the mandrel at the conclusion of the winding operation.

Another object is to provide a winding machine having a driven mandrel and including motor driven delivery means for feeding flexible work material under uniform tension to the mandrel for winding thereon, and including feed means operable to apply the flexible material in adjacent coils progressively upon the mandrel as a part of the winding operation, the delivery means and the mandrel being driven in one direction to wind the flexible material on the mandrel and being reversible to unwind the material, and the feeding means being reversible independently of the winding mandrel and the delivery means, whereby the flexible material may be wound upon the mandrel in layers applied successively in alternate directions.

Another object is to provide means operable automatically to regulate the winding speed of the mandrel in proportion to the increase in winding diameter of a coil being wound due to the application thereon of successive wound layers of the flexible work material, to the end that the linear winding speed of the work material may remain substantially constant.

Another object is to provide indicator means for showing, visually or otherwise, the progress of the winding operation at all times during the progress thereof.

Another object is to provide means for stopping or otherwise disabling the winding machine in the event that any wire of a series being wound should break or when a delivery spool becomes empty.

The foregoing and numerous other important objects, advantages and inherent functions of the invention will become apparent and more fully understood from the following description which, taken in connection with the accompanying drawings, discloses a preferred embodiment of the invention.

Referring to the drawings:

Fig. 1 is a front elevational view of apparatus embodying the present invention;

Fig. 2 is an end view of the apparatus shown in Fig. 1;

Fig. 3 is a sectional view taken substantially along the line 3—3 in Fig. 1;

Fig. 4 is an end view of the apparatus shown in Fig. 3;

Fig. 5 is a sectional view taken substantially along the line 5—5 in Fig. 4;

Fig. 6 is a sectional view taken along the line 6—6 in Fig. 1;

Fig. 7 is a view taken along line 7—7 in Fig. 6;

Fig. 8 is an enlarged view of a portion of the apparatus shown in Fig. 1;

Fig. 9 is a sectional view taken along the line 9—9 in Fig. 8;

Fig. 10 is an enlarged view of a demountable mandrel forming a part of the structure shown in Fig. 8;

Figure 11:
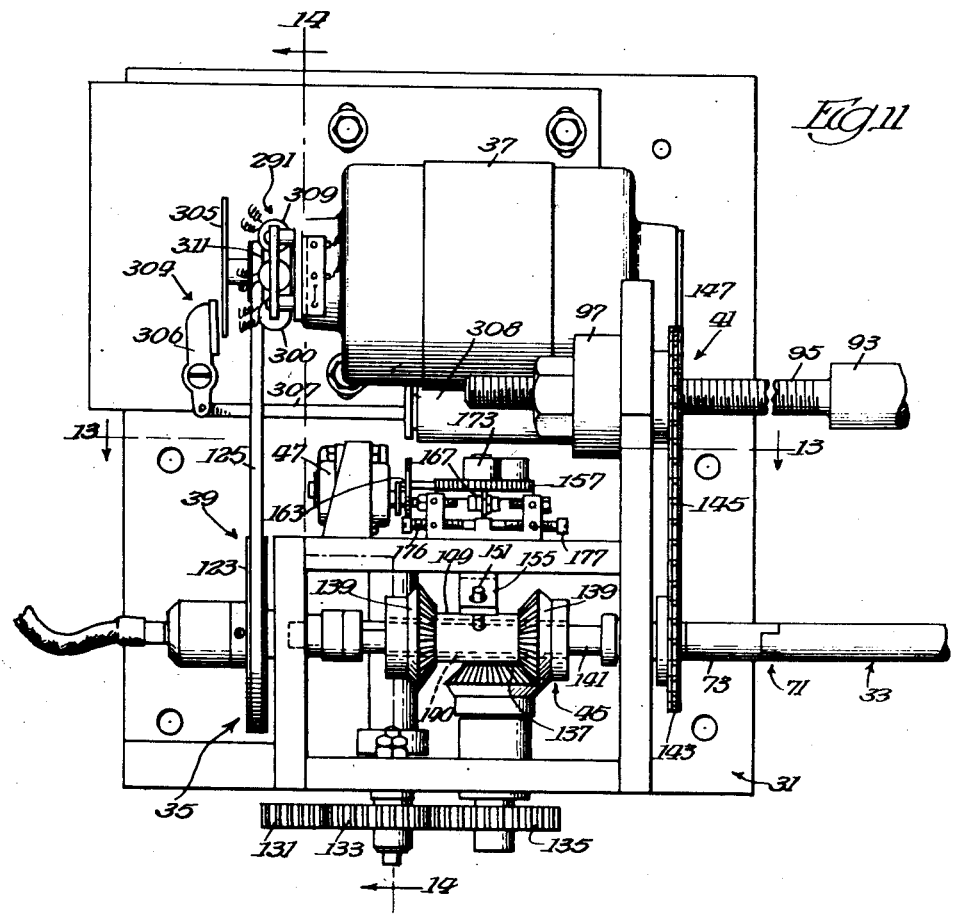
Fig. 11 is a top plan view of driving mechanism for the machine shown in Fig. 1.
Figure 12:
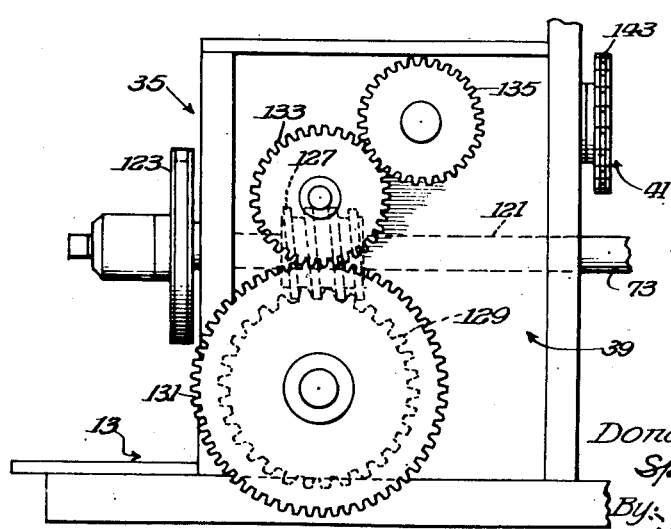
Fig. 12 is a front view of the mechanism shown in Fig. 11.
Figure 13:
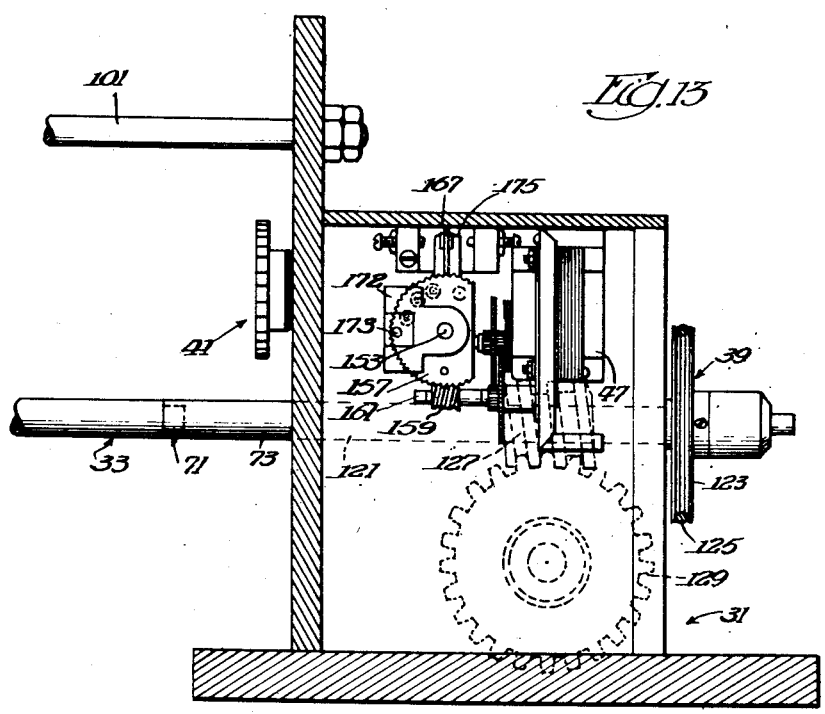
Figure 14:
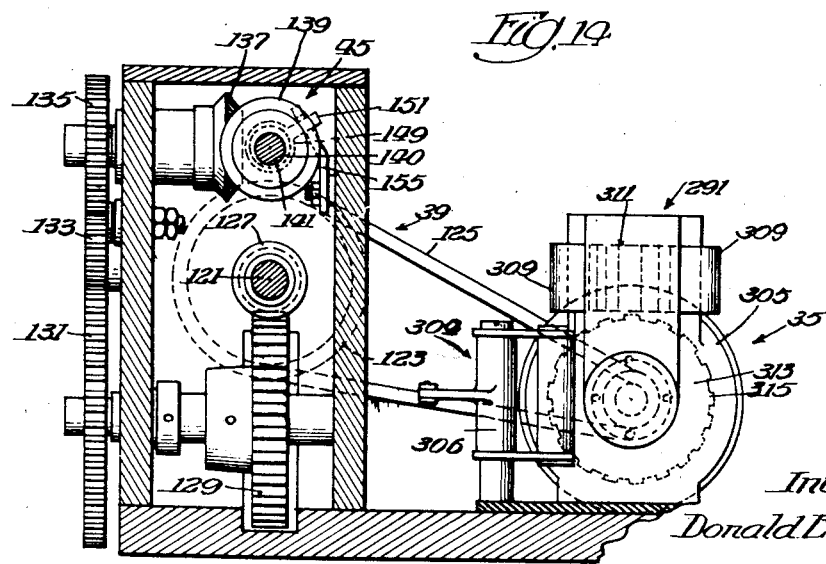
Figure 20:
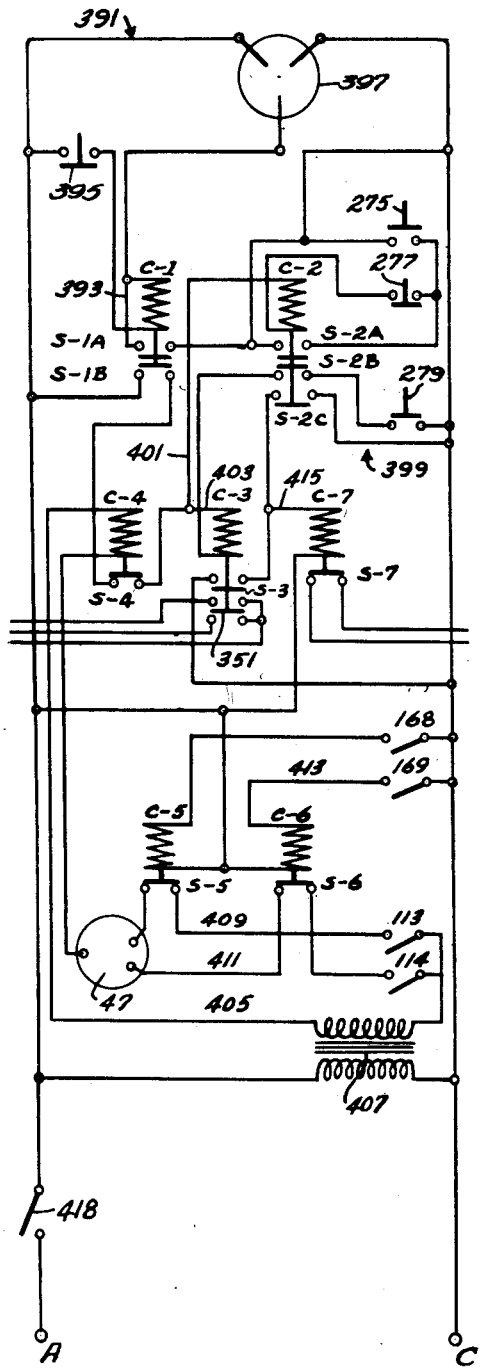
Figure 21:
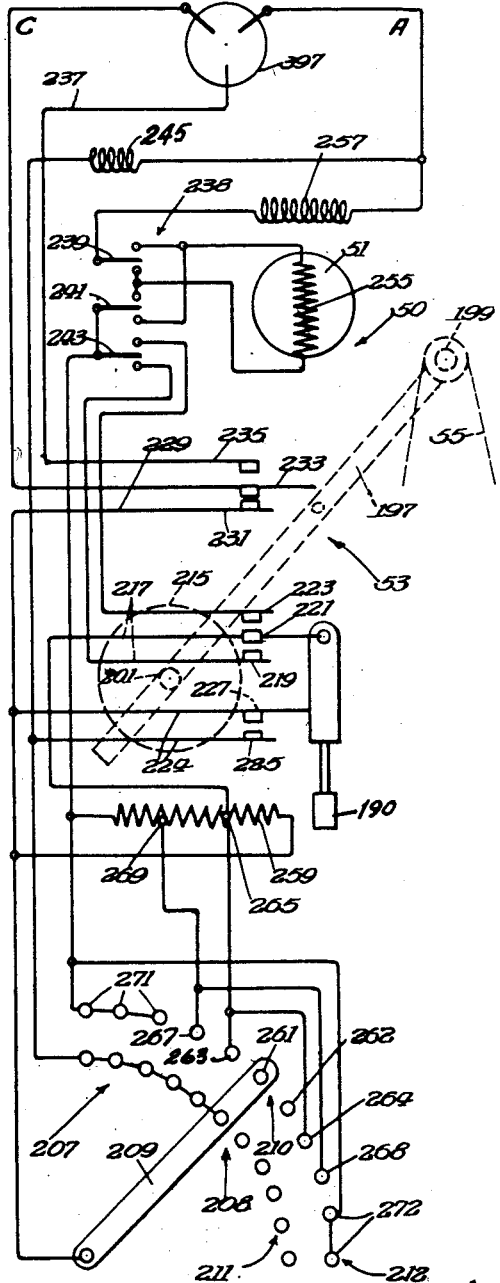

Figs. 13 and 14 are views respectively taken along lines 13—13 and 14—14 in Fig. 11;

Fig. 15 is an enlarged view of a portion of Fig. 13;

Figs. 16 and 17 are sectional views taken respectively along lines 16—16 and 17—17 in Figs. 15 and 16;

Figs. 18 and 19 are, respectively, back and side views of an indicator and speed regulator forming part of the device shown in Fig. 1; and Figs. 20, 21 and 22 are electrical diagrams.

To illustrate the present invention, I have shown on the drawings winding apparatus comprising mandrel means 33 on which flexible work material, such as wire 55, may be wound, motive means 35 for turning the mandrel in one direction to wind the work material on the mandrel and in the reverse direction to unwind work material from the mandrel, traverse means 41 for guiding the work material onto the mandrel and progressively along the same, the traverse means being reversible to operate in either direction, and delivery means 50 for feeding the work material to and for withdrawing material from the mandrel at a variable rate of speed so that the material is under uniform tension regardless of mandrel speed or direction of rotation. The apparatus is mounted on a suitable support frame 31 and suitable controls for operating the mechanism, including electronic apparatus for controlling the operation of the motive means 35, are of course provided, manually operable means for adjusting and operating the controls being conveniently disposed on a panel 40 mounted in the frame. The winding machine preferably embodies one or more winding stations at each of which the work material may be applied to the mandrel, there being shown six such winding stations in the machine illustrated in Fig. 1 of the drawings.

In addition to the mandrel, the winding machine comprises the driving means 35 including a main drive motor 37 and transmission means 39 for turning the mandrel. The traverse means 41 includes guides 43, there being a set of guides at each winding station, for applying the flexible work material on and progressively along the mandrel. The traverse means is reversibly driven from the motor 37 through reversing gears 45 forming a part of the transmission means 39, so that the work material may be wound on the mandrel successively in opposite axial directions to thereby allow for the application of successive coil layers on the mandrel. The reversing gears 45 are preferably actuated by a suitable reversing motor 47.

In the illustrated embodiment, the flexible work material 55 is delivered to the mandrel 33, for winding thereon, from the delivery means 50 comprising supply reels 49 driven by motors 51. The reel driving motors 51 are preferably controlled by control mechanism 53 to turn the reels in one direction to deliver the work material to the mandrel when the principal driving motor 37 is driven in a direction to wind the work material on the mandrel, the motors 51 being reversible by the mechanism 53 to rewind the work material on the reels 49 when the mandrel turns in a direction to unwind work material from the mandrel.

The control means 53 serves to maintain a predetermined tension in the work material at all times whether the material is traveling toward and being wound upon the mandrel, or whether the material is being unwound from the mandrel and rewound upon the reels 49. The control means 53 also incorporates means whereby the entire equipment is disabled and the winding or unwinding operation is stopped in the event that any of the wires or filaments of work material should break or if any of the reels 49 should become empty during the winding operation.

Connected with the main driving motor 37 is a mechanism 57 comprising a turn counter 59 and speed regulator or adjusting means 61 operable to control the speed of the driving motor 37 in proportion to the increase in winding diameter of coils being wound on the mandrel due to the application of successive coil layers. The speed regulator is adapted to maintain constant the linear speed of delivery of the work material on the mandrel by reducing the angular speed of rotation of the mandrel proportionally as the winding diameter increases.

It should be understood that the machine shown in Fig. 1 of the drawings is arranged to wind the work material upon the mandrel in successive layers. The winding of the initial layer preferably commences at a predetermined starting point in each winding section of the mandrel. The several guide means 43, in the starting position, are each disposed opposite the starting point of the corresponding winding section of the mandrel. Since the winding operation is identical at each of the several winding stations, the operation will be described at a single station and will apply to all stations. During the application of a wound layer, the traverse means 41 causes the guides 43 to travel at a uniform rate parallel to the mandrel, while the flexible material or wire 55 is delivered from the reel 49 through the tensioning mechanism 53 and the guides 43 onto the mandrel. After a layer has thus been applied for as many wound turns as may be desired, the direction of movement of the traversing means 41 may be reversed through the operation of the reversing motor 47 and the gears 45, whereupon continued operation of the machine will apply a successive wound layer upon the previously wound layer, the traversing mechanism, during winding of the successive layer, merely causing the guide means 43 to return to the initial or starting point, thereby guiding the work material upon the mandrel to apply a successive layer on top of the layer previously wound. The traversing means may thus be reversed as many times as may be necessary to apply a desired number of wound layers upon the mandrel. At the conclusion of the winding of each layer, the regulating means 61 may be adjusted to regulate the speed of rotation of the mandrel, and the number of turns composing a layer is shown by the indicator 59 at all times during the layer winding operation.

Control means 63 is provided on the frame 31 and on the traverse means 41 for stopping the winding operation automatically at the conclusion of the winding of each layer, in order to prevent over-winding. The control means 63 also provides for uniform acceleration of the mechanism during the initial portions of a layer winding stroke of the traverse means, and for the uniform deceleration of the machine during the terminal portions of a layer winding stroke, in order that sudden strains in the work material may be avoided. The winding machine is adapted to operate at high speed during the major portion of the layer winding stroke and the provision of means for uniformly accelerating and decelerating the machine initially and at the conclusion of the layer winding stroke insures against breakage of the work material during such periods and is an exceedingly valuable feature, particularly where the work material is of fragile character.

Means is also provided for "inching" the winding machine to apply turns or fractional turns in a wound layer at slow speed to obtain a desired number of turns, as when making a tap connection on the coil, the number of wound turns being indicated by the device 59.

*The winding mandrel*

The winding mandrel 33, the details of which are shown in Fig. 10 of the drawings, may be and preferably is formed as a sectional rod comprising winding sections 65 adapted to be secured together in end-to-end relationship in quick detachable fashion. As shown, each winding section extends at two winding stations and each is adapted to carry spool or tube means for receiving the work material. To this end each section may receive thereon support tubes in end-to-end abutting relationship or may receive a single tube adapted to carry one or more wound coils thereon. Such single tube, after the winding operation, may be severed between the coils in order to separate the same. The winding tubes may be mounted on the detached mandrel sections, which may then be secured together and mounted in winding position in the machine. Obviously, any number of coils may be wound on a mandrel section depending of course upon the size of the coils and the length of the winding section, and I do not necessarily limit the invention to the utilization of a sectionalized mandrel nor to a mandrel having any definite number of winding stations. The machine illustrated in the drawings, in which six winding stations are shown, may be utilized with any desired number of its winding stations inactive. For example, the machine may be used with only the first, third and fifth stations in operation, in order to produce three long coils simultaneously, one on each of the three mandrel sections shown. By incorporating three additional winding stations, including delivery units and guides, in the illustrated apparatus, three short coils could be wound on each of the three mandrel sections. As a consequence, the machine is entirely flexible insofar as the number of winding stations and mandrel sections is concerned.

The mandrel is supported on the frame 31 in a pair of bearing pedestals 67 which provide seats for demountably receiving the bearings 69. The bearings 69 are mounted in spaced relationship upon the mandrel and are removable from the pedestals 67 with the mandrel. At one end the mandrel is provided, as at 71, to make driving connection with a shaft 73 comprising a headstock and forming a part of the driving means 35 which means is supported and suitably journaled on the frame 31. The other end of the mandrel is provided with an axial cavity 75 for the reception of a tailstock 77 suitably mounted and supported in a pedestal member 79 forming a part of the frame 31.

The mandrel may comprise two parts 76 and 78, the part 76 forming two winding sections 65 and having a roller bearing 69 mounted centrally thereon. The opposite ends of the part 76 each have a diametral rib 80 and a projecting cylindrical finger 82 extending axially from the center of the rib. The other mandrel part 78, at one end, and also the headstock 73 are formed each with a slot 84 and a cylindrical cavity 85 for receiving a rib 80 and a finger 82 of the part 76. The end of the part 78 remote from the slot 84 is formed with the tailstock cavity 75; and the part 78, near its end having the slot 84 carries a bearing 69 thereon. The parts 76 and 78 may be knurled as at 88 to turningly engage winding tubes or spools that may be placed on the parts to receive the work material.

The tailstock 77 comprises a shaft 81 having a head 83 at one end formed with a conical point adapted for reception in the end cavity 75 in the mandrel. The head 83 is slidingly received in a support sleeve 85 which is mounted in bearings 87 for rotation in the support pedestal 79. The head 83 is yieldingly urged, as by means of a spring 89, within the sleeve 85 in a direction normally to press the head 83 upon the end of the mandrel when the same is in place in the bearing supports 67. The spring surrounds the shaft 81 and presses at one end on the head 83 and at the other on a shoulder formed internally on the sleeve 85. In order to release the mandrel for removal from the bearing supports 67, the tailstock 77 may be retracted against the influence of the spring 89 by pulling upon a handle 91 which is fastened to the stem 81 at the end thereof opposite from the head 83.

*The feed or traverse mechanism*

In order to apply the work material 55 progressively along the mandrel in an axial direction so that the turning of the mandrel will wind the work material thereon in adjacent uniformly spaced coil turns, the feed mechanism is arranged to advance the guide means 43 progressively in a direction parallel to the mandrel. To this end, the feed mechanism comprises a shaft 93 slidingly supported at one end in the pedestal 79 in spaced parallel relationship with respect to the mandrel. The shaft 93 has a threaded portion 95 extending through a nut 97 turnably mounted in the frame 31 and drivingly connected with the drive mechanism 35. The shaft 93 is held from turning by means of an arm 99 which is fastened to the shaft and has a portion slidable on a rod 101 which forms a part of the frame 31 extending parallel to the shaft 93. The nut 97 is driven by the main driving motor 37 through the transmission means 39, including the reversing gears 45. When the nut is driven in one direction, its engagement with the threaded rod portion 95 will cause the rod to travel axially in one direction, the movement of the shaft 93 being reversed when the nut is driven in the opposite direction, which is accomplished by operating the reversing gears 45.

The shaft 93 carries the guide means 43 at spaced intervals thereon. The guide means each comprise a pair of pulleys 103 rotatably supported on an arm 105 which in turn is rigidly secured on the shaft 93. As a matter of convenience in mounting the arm 99 and the arms 105 on the shaft, in axially adjustable position therealong, said shaft is provided with a longitudinal spline groove 107, while the arms 99 and 105 have hubs to slidingly embrace the shaft. The hubs are provided with fastening screws 109 arranged diametrically therein which bear at their inner ends preferably on spline members adapted to extend in the groove 107 and anchor the arms in place when the fastening screws 109 are tightened.

The control means 63, heretofore mentioned for controlling the drive motor 37, preferably comprises an electrical coil 111 and a pair of limit switches 113 and 114 secured upon the pedestal 79 adjacent the shaft 93. The shaft 93 on opposite sides of the pedestal 79, in which it is journaled, carries support members 115 comprising hubs similar to the hubs of the arms 105 and secured in like fashion on the shaft 93 by means of set screws. These hubs 115 carry adjustable switch actuating stops 117 and 118 in position to actuate the switches 113 and 114, respectively at the opposite ends of the layer winding stroke of the shaft 93. The switches 113 and 114 are interconnected in an electrical system controlling the operation of the driving motor 37 and serve to stop the motor at the conclusion of each layer winding stroke of the shaft and may also serve to aid in the control of the reversing gears 45. The support members 115 also carry blades 119 in spaced-apart, axially adjustable relationship, these blades being supported in position to be carried by the shaft 93 across the end of the coil 111 at each end of the layer winding stroke. These blades are inclined and serve to progressively decrease the reluctance of the magnetic circuit of the coil 111, and thus increase the impedance of coil 111, as the shaft 93 approaches the end of its layer winding stroke. The coil 111 is electrically connected in the control circuit of the motor 37 so that increased impedance of the coil 111 automatically reduces the speed of the motor at each end of the layer winding stroke of the shaft 93.

The drive mechanism

The main driving motor 37 is connected to turn the mandrel and operate the traverse mechanism through the driving means 35 which is preferably mounted on and partly enclosed in a gear box on the frame 31. As shown, the drive means comprises a drive shaft 121, one end of which forms the headstock 73 of the mandrel. The other end of the shaft 121 is provided with a pulley 123 drivingly connected with the motor as by means of a belt 125, although other suitable driving connection may, of course, be employed. The mandrel is thus driven by the motor through the belt and pulleys and the shaft 121. In order to actuate the traverse mechanism, the shaft 121, in the illustrated embodiment, is provided with a worm 127 which drives a wheel 129. This wheel is drivingly connected by intermeshed gears 131, 133 and 135 with a beveled pinion 137. This pinion is disposed in position to engage either one of two beveled gears 139 which comprise the reversing gears 45. The gears 139 are mounted on a common sleeve 140 which is splined upon a shaft 141 for sliding movement therealong so that either one or the other of the gears 139 may be drivingly engaged with the pinion 137. The pinion 137, of course, is driven by the motor 37, through the shaft 121. When the motor 37 is turning in one direction, the shaft 141 will be driven in one direction when one of the gears 139 drivingly engages the pinion 137, but will turn in the opposite direction when the other of said gears 139 is drivingly connected with the pinion 137. The shaft 141 carries a sprocket wheel 143 drivingly connected, as by means of a chain 145 or other suitable drive means, with a sprocket 147 fastened to the traverse nut 97.

The gears 131, 133, and 135 are preferably made interchangeable with similar replacement gears having either a greater or a lesser number of teeth, in order to allow for changing the relative speed of the traverse mechanism with respect to the driven speed of the mandrel. By thus changing the relative speed of the mandrel and traverse mechanism, the spacement of adjacent turns in windings applied on the mandrel may be changed in order to spread the windings further apart, or to wind them more closely together as desired, and to impart operating flexibility in the winding mechanism so that work material of large and small gauge may be accommodated in the same machine.

The reversing mechanism

In order to actuate the reversing gears 139, the common sleeve 140 on which the same are mounted is provided with a tubular collar 149 surrounding the sleeve between the facing beveled gears 139. This collar has a radially extending actuating finger 151 and forms a gear shifting yoke. The gear box carries a shaft 153 journaled in and extending through a wall of the box adjacent the actuating finger 151, and said shaft 153 is formed with an arm 155 having an opening for receiving the actuating finger 151. By turning the shaft 153 in one direction or the other, the gear changing yoke 149 may be moved to throw either one of the gears 139 into engagement with the pinion 137.

In order to shift the gears, the shaft 153 is yieldingly connected to a worm wheel 157 drivingly engaged by a worm 159 on a shaft 161 which is driven by the reversing motor 47 through a suitable gear train 163. The reversing motor is preferably mounted on the outer walls of the gear box adjacent the shaft 153. The wheel 157 carries a block of insulating material 165 forming a mounting for a flexible radially extending switch blade 167 which turns with the wheel 157 between a pair of spaced-apart facing switch contacts 168 and 169. These contacts are carried in a preferably insulated mounting 170 on the walls of the gear box and are interconnected in the control circuit of the motor 47 so that after the same has been started to shift the reversing gears 45, the motor will continue to turn until the completion of the gear shifting operation in one direction, at which instant the motor will be stopped by the engagement of the switch blade 167 with one of the switch contacts 168 or 169. Thereafter, when the motor 47 is started it will run in the opposite direction to again shift the reversing gears, the motor will continue to operate in such reversed direction until the switch blade 167 engages the other one of said switch contacts 168 or 169, thereby stopping the motor at the completion of the gear shifting operation.

The worm wheel 157 preferably is not fast on the shaft but is drivingly connected thereto by a fitting 171 having a hub secured to the shaft adjacent the wheel and a pair of arms 172 extending adjacent a face of the wheel. The wheel has a finger 173 extending between the arms 172, and the arms have spring pressed shoes 174 on opposite sides of the finger. This arrangement will allow the worm wheel 157 and switch 167 to be turned by the motor even though the shaft 153 be prevented from turning, as by faulty meshing of the reversing gears 139 with the pinion 137. Under such condition, the top of a tooth of the pinion may, for an instant during the gear shifting operation, register with and engage the top of a tooth of the gear 139 being meshed. Since the pinion 137 is driven, it will almost instantly advance with respect to the gear 139 and become meshed therewith, but the yielding connection afforded by the fitting 172 allows the gear wheel to override on the shaft, thus protecting the transmission means between the motor 47 and the shaft 153 against damage during the interval when the teeth of the pinion 137 and a gear 139 may come into jamming engagement during the gear shifting operation.

The shaft 153 also carries a radial arm 175 fixed thereon, which arm extends between a pair of adjustable stops 176 and 177 in a bracket on the gear box. The stops are adjusted to engage the arm 175 and limit its movement in either direction to thus limit the shifting movement of the reversing gears 139, so that the same may be in proper relative position with respect to the pinion 137 when drivingly connected therewith.

*The turn counter and speed adjusting device*

The turn counter 59 and the speed adjusting device 61 are preferably mounted in a suitable housing or support on or adjacent the control panel 43. The turn counter may comprise a pair of pointers 178 driven by a suitable reducing gear train actuated by a preferably flexible shaft directly connected to the shaft 121. The pointers may turn in front of an indicator dial graduated to show revolutions of the mandrel and the gear train may cause one of the pointers to make one complete rotation, with respect to the dial, for every one hundred turns of the mandrel, the other pointers being geared to make one complete rotation for every ten thousand turns.

The speed adjusting device 61 may comprise a resistor 179 having circularly arranged contacts 180 and a pivoted arm 181 to progressively engage the contacts and thus alter the resistance in circuit between the arm and one end of the resistor as the arm is moved. The arm may be drivingly connected with the shaft 121 through the gear train which drives the counter device 59. As shown, the arm is driven by said gear train through a gear 182 and a friction clutch 183 which allows the handle to be set manually to any desired position by slipping the clutch.

*The delivery mechanism*

In order to feed the work material 55 from the storage reels 49 for winding on the mandrel, I provide a delivery unit 53 at each of the several winding stations. These delivery units each include a motor 51 for driving an associated reel 49 in one direction to deliver the work material or wire therefrom for winding on the mandrel, and, in the reverse direction, to rewind wire upon the reel. A spring 203 in each unit 53 maintains a substantially uniform predetermined tension in the work material or wire during the operation of the winding mechanism to deliver work material for winding on the mandrel, and also to maintain uniform tension while the material is retracted from the mandrel and rewound on the storage reel 49. Each unit 53 also includes a highly sensitive quick acting mechanism to deliver work material to the mandrel as demanded and to rewind work material as rapidly as it is supplied.

To this end, the motor, which may be powered from a suitable electric power line comprising conductors A and C, is controlled by motor reversing and speed varying means operating under the control of a tension member which moves in response to differences in the linear speed of the work material or wire at the mandrel and at the storage reel. When such speed difference results in an increase in length of the work material between reel and mandrel, the tension member will move in one direction and change the motor speed, thus compensating for such speed differences. Conversely, when the speed difference results in a decrease in length of the material, the tension member will move in the opposite direction and change the motor speed to compensate for the speed difference. This tension member may comprise a pivoted tension arm 197 yieldingly urged upwardly by the spring 203 and carrying a pulley 199 over which the work material 55 may travel toward or away from the mandrel. The spring 203 maintains a uniform tension on the wire 55 through the medium of the tension arm 197.

In rewinding work material on the reel, the speed control operation reverses, undue length of the wire being compensated for by speeding the motor, while insufficient length is relieved by slowing the motor.

The speed control means will accurately compensate for gradual changes of linear speed of the work material at the spool relative to the linear speed of the work material at the mandrel. However, the speed control apparatus may lose control in response to a sudden, relatively large change in linear speed of work material at either of these two points. In order to eliminate this loss of control, I provide, in addition to the progressively acting speed control, a separate quick acting means, responsive to sudden movement of the tension arm, for changing the speed of the motor more rapidly than is accomplished by the progressively acting means. The quick acting means operates during a relatively short period of time and in response to movement of the member 197 due to a rapid change in the linear speed differential of the work material at the reel and at the mandrel.

My tension device, therefore, comprises a motor driven reel for delivering or rewinding the work material and having progressively acting means for controlling the motor speed to maintain substantially uniform delivery of the work material as it is delivered from, or as it is rewound on the reel. The control also includes quick acting means for controlling the motor in response to rapid fluctuations in work material delivery. The control also includes means fully and instantaneously automatic for causing delivery of the work material merely as and when work material is wound upon the receiving mandrel and for causing rewinding of the work material on the reel as the same is unwound from the mandrel.

The unit 53 comprises a pedestal 185 which supports an assembly including a frame 187 forming a journal for a shaft 189. This shaft is preferably mounted in roller bearings and has a projecting end for the demountable reception of the supply reel 49. The frame 187 also forms a mounting for the reversible reel driving motor 51 which is drivingly connected with the shaft 189 as by sprockets 191 and a chain 192. The unit 53 also includes the control mechanism for regulating the speed and direction of the motor 51 and for maintaining the required delivery of the work material 55.

The control mechanism is preferably mounted in a box enclosed frame 193 carried on the pedestal 185 and the electrical connections are shown in Fig. 21.

The frame 193 carries the guide pulley 195 and the pivoted arm 197 which carries the pulley 199 and forms the tension member heretofore mentioned. The arm 197 is suitably mounted on a shaft 201 which is carried by the frame 193, preferably in roller bearings. The work material extends from the reel 49 over the pulley 195 and the pulley 199, thence around the guide pulleys 103 to the mandrel. In order to tension the work material 55, the arm 197 is yieldingly suspended on a spring 203 by means of a belt 205 which is connected on a pulley 206 on the shaft 201. The spring yieldingly urges the arm about its pivot in a direction to tension the work material. In order to insure proper delivery of the work material, the control means is arranged to change the speed of the drive motor 51 whenever the delivery rate varies from the desired optimum, this variation being evidenced by movement of the arm 197. The control means also operates to reverse the motor under some circumstances. To this end, the arm 197, at the pivot 201, carries circular switch means 207 comprising switches 208 and 210. These switches comprise blades 209 on the arm in position to progressively wipe switch contacts 211 and 212 mounted in a plate of insulating material fastened on the frame 193 adjacent the pivot 201. The contacts 212 and their cooperating blade 209 form the progressively acting switch means 210 for controlling motor speed, while the contacts 211 and cooperating blade form the switch 208 which controls the reversal of the motor 51.

The arm 197 also carries a mounting plate 215 on which is fixed a single-pole, double-throw contact switch 217 having contact blades 219 and 223 and a pole blade 221 movable to make contact either with the blade 219 or the blade 223. This switch 217 forms the quick acting control means for rapidly changing the motor speed in response to sudden and substantial changes in work material delivery.

The plate 215 also carries another switch 224 comprising blades 225 and 227, the latter being movable in one direction to engage, and in the other direction to release the blade 225. This switch 224 also comprises quick acting means for reversing power flow to the motor to slow same down for short periods upon occasion independently of switch 208.

The blades 221 and 227 are connected with yielding means tending to hold the same stationary, the yielding means conveniently comprising a dashpot 190 on the frame 193. This dashpot tends to hold the switch blades 221 and 227 stationary so that any sudden movement of the arm 197 upwardly will close the blades 219 and 225 against the blades 221 and 227, while sudden movement of the arm downwardly will close the blade 223 against blade 221.

There is also a safety switch 229 mounted on the frame 193 to stop the machine altogether in the event that the work material breaks or the reel 49 becomes empty, thus relieving the arm 197 of all tension. The switch 229 comprises a pair of contact blades 231 and 235 and a pole blade 233 normally biased to make contact with the blade 231 so that the switch 231—233 is normally closed. This switch is in the power supply line to the motor 51 and its control apparatus, the blade 233 being connected to one side C of the supply circuit. Upon release of all tension on the arm 197, the same will swing under the influence of the spring 203 to a position in which a pin or finger 236 on the arm engages the pole blade 233 of the switch and moves it out of contact with the blade 231, thus breaking the motor power supply circuit, and throwing it into contact with the blade 235 which is connected by means of a conductor 237 in the control circuit of the motor 37 and arranged to stop said motor when the blade 235 is connected to the line by engagement with the blade 233.

Operation of the motor 51 is controlled by a relay switch 238 having blades 239, 241 and 243, each cooperating with a pair of contacts under the control of a relay coil 245. The blades 239 and 241 cooperate with switch contacts connected with the armature 255 of the motor 51 so that the motor 51 normally turns in a direction to deliver work material from the reel 49 so long as the coil 245 is de-energized. When the coil 245 is energized, however, the motor will turn in a reverse direction to rewind work material on the reel 49. The blade 239 is connected with one side A of the motor power supply circuit through the field winding 257 of the motor 51. The switch blade 241 is connected with one side of a tapped motor control resistor 259 comprising a pair of resistance elements mounted on the frame 193, the other side of said resistor being connected, through the switch 231—233, with the other side C of the power supply circuit.

While any suitable speed control may be utilized, I prefer to control the motor speed in accordance with my present invention by varying the effective resistance of resistor means 259 in the motor power circuit, this being a convenient method for varying the motor speed; and I prefer to vary such speed controlling resistance by use of progressively operating switch means 210 actuated by the tension member in response to variations in delivery of the work material as it travels toward or away from the mandrel.

The blade 209 of the switch 210 is electrically connected with that side of the resistor 259 which is connected to the power line C through the switch 231—233, and the contacts 212 of switch 210 are interconnected with taps on the resistor 259 so that, depending upon the fluctuating position of the blade 209, variable portions of the resistor 259 may be cut out of the motor circuit from time to time. The contacts 212 include intermediate contacts 261 and 262 which are not connected, the same comprising idle contacts in position for engagement by the blade 209 when the arm 197 is in an intermediate operating position occupied by it while the mandrel is stationary. On either side of the contacts 261 and 262 are contacts 263 and 264 which are electrically interconnected and connected with a tap 265 on the resistor 259 at a selected distance from that end of the resistor which is connected through the switch 231—233 with the power supply circuit. Outwardly of the contacts 263 and 264 are contacts 267 and 268 which are electrically interconnected and connected with another tap 269 on the resistor 259 at a point between the tap 265 and that end of the resistor which is connected with the motor through the switch blade 241. Outwardly of the contacts 267 and at each end of the contact set 212 are contacts 271 and 272 which are electrically interconnected and connected with that end of the resistor which is connected through the switch blade 241 with the motor.

This arrangement is such that when the arm 197 is floating in an intermediate position with the switch blade 209 engaging either of the contacts 261 or 262 the entire resistance of the element 259 will be in series with the motor 51 across the supply line and the motor will be subjected to minimum torque and may remain stationary. When, however, the arm has shifted from the intermediate position in either direction from contacts 261, the resistance of the unit 259 in the motor circuit will be progressively cut down and motor speed progressively increased by contact of the blade 209 successively with the switch contacts 263, 267 and 271, when moving in one direction and with the contacts 264, 268 and 272 when moving in the other direction. The resistance 259 is entirely short-circuited when the blade 209 engages the contacts 271 or the contacts 272 at which times the motor will operate at top speed.

The third blade 243 of the relay switch 238 normally engages a contact which is electrically connected with the blade 223 of the switch 217, but, when the coil 245 is energized, the blade 243 will engage a switch contact that is connected to the blade 219 of the switch 217. The quick acting means may conveniently comprise a switch 217 connected to cut out from the motor circuit a substantial amount of resistance in addition to that controlled by the progressively operating means; and while, in some circumstances, it may be desirable to cause the quick acting means to add resistance in the circuit in order to slow the motor down, I have in the present embodiment found it necessary only to arrange the quick acting means in such a way as to cut out resistance in order to speed up the motor, since I provide for slowing the motor down when necessary by momentary power reversal on the motor by placing the relay operated reversing switch 238 under the control of the quick acting switch 224.

The switch 224 is connected in parallel relationship with the switch 208, and these switches serve to control the relay coil 245, one end of which is connected to one side of the supply circuit and the other end of which is connected to the switch blade 225 and with those contacts 211 of the switch which are engaged by the switch blade 209 when the floating member is riding in the position occupied by it when the mandrel is stopped or is turning in a direction to unwind work material for rewinding on the reel. The switch blades 209 and 227 are connected through the switch 231—233 with the other side of the power supply circuit. The contact set 211 comprises active elements which are electrically interconnected and connected with the relay coil 245, said active contact elements extending from intermediate switch position, opposite the contact 261 of switch 210, to one end of the contact set, so that the blade 209 will engage these active contact elements and energize the relay coil whenever the arm 197 moves into the intermediate zone, upon stoppage of the mandrel, and beyond such intermediate zone when work material is being released from the mandrel.

The remaining contacts of the set 211 are idle contacts and are engaged by the blade 209 without effect upon the relay coil 245 whenever the arm 197 is in the position determined by mandrel movement in a direction to wind the work material thereon. Under the control of the switch 208, therefore, the relay coil will become energized whenever the blade 209 engages the active contacts but will be and remain de-energized so long as the blade 209 engages the inactive contacts.

When the mandrel is turning to wind material thereon, the arm 197 will be moved downwardly by the work material against the tension of the spring 203. When the mandrel is turned to unwind the work material, the arm will move upward. I utilize this movement to control the reversal of the motor through the switch 208 and the reversing switch 238 so that the motor will turn the reel to deliver work material or to rewind the same on the reel depending upon the direction of rotation of the mandrel. So long as the mandrel is winding up the work material, the floating member 197 will hold the switch 208 in position opposite the inactive contacts 211 thus maintaining the reversing means inactive so that the reel motor may operate in a direction to deliver the work material for winding on the mandrel. Thus, the action of the reel to deliver or to rewind the work material is fully automatic and is instantly responsive to the mandrel. When the mandrel is turning to wind the work material thereon, the reel motor turns the reel to deliver work material under uniform tension as fast as demanded by the mandrel. When the mandrel stops. the arm moves upwardly to a position reversing driving torque on the motor and then, if the mandrel continues to remain stationary, the arm 197 will be driven down slightly by the successive reversal of torque on the reel motor. Such arm movement will immediately actuate the switch 208 to de-energize the reversing switch 238 and the arm will again move upwardly. This cycle which alternately reverses the driving torque on the stationary reel motor will continue so long as the mandrel remains stationary, the control apparatus, so to speak, marking time in readiness to start the reel motor off in either direction. If the mandrel resumes its winding motion, after stopping, the reel motor reversing means is instantly de-energized and the reel delivers the work material to the mandrel; but if, after stopping, the mandrel is started in a direction to unwind work material therefrom, the blade 209 of switch 208 will engage the active contacts 211 and will energize the reversing switch so that the reel motor will instantly operate in reverse to rewind the work material on the reel as fast as it is released from the mandrel, such rewinding being accomplished at substantially uniform tension maintained in the work material by the spring 203.

The relay coil 245 will be energized by the switch 224 instantly when the arm 197, regardless of its position, moves sharply in a direction representing sudden decrease in delivery of the work material. If this happens when the material is being paid out from the reel, the motor will be instantly slowed to decrease delivery of the work material as a result of the reversal of power thereon due to operation of the relay switch. Sudden increases in delivery of the work material during rewinding thereof on the reel will also result in closure of the switch 224, but since, during rewinding, the relay coil 245 is energized by the switch 208, closure of the switch 224 will not affect the motor. However, increases in delivery of the work material during rewinding is corrected by causing the motor to speed up. This is accomplished by the closure of switch 219—221 which cuts out of the motor circuit the resistance between the tap 265 and the end of the resistor 259 that is connected to the switch blade 241.

*Electrical control and operation of the winding machine*

The main driving motor 37 is powered from a suitable line A—C, and I provide means for starting, stopping, reversing, and controlling the speed of the motor 37 under the control of the slow-down coil 111, the stop switches 113, 114, the manually operable starting, stopping and inching switches 275, 277, 279 which are disposed on the control panel 40 mounted on the frame 31, the speed regulator means 61, and the switch 233—235 in the tension control unit 193. While any suitable or preferred system for controlling the motor 37 may be employed, I prefer to control the motor by means of a manually operable reversing switch 283 located on the panel 40 and a variable reactance 285 in the circuit of the motor.

Control of the speed of the motor 37 is accomplished by altering the impedance in the reactor 285, as by varying the D. C. input to a saturating coil 287 which is inductively coupled with the coil 285 and which serves to control the saturation of the core of the reactor. In order to control the saturation of the reactor, I prefer to utilize an electronic system 293, operating in conjunction with a generator 291, which is driven by the motor 37 and which produces alternating current power, the voltage of which varies directly with the speed at which the generator is driven, within its operating speed range. The generator 291 is connected to control direct current flow in the winding 287 by means of the electronic system 293 which serves to amplify and rectify alternating current power delivered from the generator, filter said rectified power and utilize the same to control flow of direct current to the saturating winding 287 of the motor control reactor, and so control the impedance of the reactor. As the impedance of the reactor winding 285 is increased by decreased direct current flow in the saturating winding 287, the speed of the motor 37 will decrease, and vice versa.

The electrical equipment and connections for operating the motor 37 are shown in the wiring diagram comprising Fig. 22 in which the armature 301 and the field winding 303 of the motor 37 are shown connected in series with the reactor winding 285 and the power source A—C. The armature winding 301 of the motor is connected in the motor circuit by means of the manual switch means 283, which serves to reverse the connection of the armature winding in the circuit at the discretion of the operator.

The motor 37, as shown more particularly in Fig. 11, is provided with suitable solenoid operated brake means 304 for aiding in speed control. The brake means 304, as shown, comprise a brake disc 305 on the motor shaft and a pivoted brake shoe 306 in position to be pressed against the disc 305 to apply brake action. Spring means normally urges the brake shoe toward braking position, but the brake shoe is connected, as by an actuating rod 307, with a brake releasing solenoid 308.

The generator comprises field windings 309 and a generator winding 311, both of which are mounted on a suitable laminated core. The generator includes a rotor 313 comprising a flat metallic disc provided at its periphery with a plurality of radially extending teeth 315 so that, the field winding 309 being energized from a suitable direct current source, rotation of the rotor 313 will generate alternating current in the winding 311, the electrical potential of which varies with the speed of the driven rotor 313. Increase in the generator potential, due to increase in speed of the driving motor 37, is utilized through the electronic transfer circuit 293 to increase the impedance of the winding 285, and vice versa, to thus maintain the speed of the motor 37 substantially constant under normal operating conditions regardless of motor load.

The output of the generator 291 is delivered through a coaxial cable 317 and a resistor condenser network 319 to a control grid of a pentode tube 295. Operation of this tube 295 is under the control of the transfer system 299, which operates in manner hereinafter set forth to apply a control bias on the control grid of the amplifier tube 295 through the conductor 335. The plate circuit of the tube 295 in turn controls the grid of a triode 321.

The energy output from the triode 321 is delivered through a transformer 323 to a rectifier comprising a diode tube 325, thereby producing direct current having voltage proportional to generator speed. This direct current is filtered through a filter circuit 327 and delivered, through a pentode tube 329, to a control circuit 330 comprising a pair of tubes 331 and 333 by applying the output of tube 329 to vary the potential of the grids of tubes 331 and 333.

The output of the tube 331 is connected to the saturating winding 287 of the motor control reactor 285. The reactive condition of the reactance 285 thus is responsive to variations in potential delivered by the generator 291, the impedance of the windings 285 being increased to slow up the motor as the generator voltage increases, and vice versa. This will normally result in substantially constant motor speed under varying load conditions.

Speed control accomplished in this fashion is supplemented by the use of the brake 304 which is operated by the solenoid 308 which in turn is actuated by the tube 333. When the solenoid 308 is energized, it retracts the brake shoe from a brake wheel or disc on the shaft of the motor 37, the brake shoe being normally spring urged to engage the brake wheel whenever the ouput from the tube 333 falls below a predetermined value, meaning that motor speed has increased above normal.

Changes in speed are obtained by varying the grid bias on the first pentode 295. To this end the grid circuit of the tube 295 is operatively associated with an electrical translation system 299 controlled by the slow-down coil 111 and the speed regulator means 61, and operative to vary the bias on the grid of the tube 295 in order to vary the motor speed.

A bias of a definite value on the grid of the tube 295 determines the top speed of the motor 37. So long as the motor-generator speed is below such speed, the combined effect of bias and generator voltage will increase the saturation of the reactor and allow the motor to accelerate to the speed limit determined by the amount of bias on the tube 295. When motor speed tends to increase above such speed, the combined effect of increased generator voltage and the definite bias is to desaturate the reactor and slow the motor down.

By varying the bias, the average saturation of the reactor will be varied and the motor speed will be changed.

Speed control through the transfer system 299 is accomplished by means of a bridge circuit 339 comprising a fixed resistance 341, an adjustable resistance 343, a fixed reactance 345, and the variable speed controlling reactance coil 111. The bridge circuit is powered by a transformer 346, the primary winding of which is energized from the power line A—C, and the secondary of which is connected in the circuit between the resistors and the reactors. The resistor side of the circuit is grounded while the reactor side is connected to the speed controlling means 61 which comprises an adjustable resistor. This resistor, in turn, is connected to a pair of adjustable resistors 347 and 349 arranged in parallel and connected through a switch 351 to the control grid of an amplifier tube 355. The output of this tube 355 is connected through a transformer 357 to a rectifier tube 359 which delivers direct current on the conductor 335 for the control of the amplifier tube 295. It will be seen that the transfer circuit 299 will apply direct current as a preselected variable bias on the control grid of the amplifier 295. The impedance in the coil 111 increases as the traverse mechanism approaches the end of a layer winding stroke of the winding machine, and this increase tends to vary the balance of the bridge and serves to vary the voltage normally applied by the bridge circuit through the transfer system 299 upon the control grid of the tube 355, thereby varying the bias on the grid of the tube 295 to cause the motor 37 to slow down.

The voltage normally applied through the bridge circuit 339 is variable under the control of the resistor or regulator means 61, which may be set to cause the motor 37 to operate at any desired speed within the range of the control. The resistor 61 is preferably provided with a series of taps representing the desired motor speed for the various winding diameters which are presented on the mandrel as successive layers of the work material are applied thereon.

The voltage applied from the bridge circuit is also under the control either of the resistor 347 or the resistor 349, depending upon the position of the switch 351. These adjustable resistors 347 and 349 are mounted on the control panel 40 where they are manually adjustable. The switch 351 normally places the resistor 349 in the control circuit so that the normal speed of the motor 37 can be adjusted by means of the resistor 349. When the operating coil C-3 of the switch 351 is energized, as by the closure of the manually operable jogging or inching switch 279 on the panel 40, the adjustable resistor 347 will be included in the circuit and may be manually set on the control panel to adjust the motor for operation at slow inching or jogging speed in winding the last few turns of work material in a wound layer.

The power supply for the system preferably comprises a pair of conventional full wave rectifiers 367 and 369. These rectifiers are energized by means of transformers 371 and 373, the primary windings of which are connected to the power line A—C, said transformers having each a main winding 375 for delivering power to the rectifier with which it is associated, an auxiliary winding 377 for energizing the cathode of its associated rectifier, and another auxiliary winding 379 for the purpose of energizing the filaments of the vacuum tubes in the system. The transformer 371 and its associated rectifier 367 are connected to deliver direct current power between the grounded side of the transfer systems 293 and 299 and the high side 381 of said systems, the winding 379 of the transformer 371 supplying filament power to the tubes 295, 321, 325, 355 and 359. The high side 381 of the systems 293 and 299 forms the low side of the power amplifying system 330 comprising the amplifier tubes 331 and 333. The transformer 373 and its associated rectifier 369 are connected to deliver direct current power between the conductor 381 comprising the low side of the power amplifying system, and a conductor 385 comprising the high side of said system. The auxiliary winding 379 of the transformer 373 supplies filament current for the amplifiers 331 and 333. The conductor 381 comprising the high side of the transfer system 293 is connected through an adjustable resistor 387 to supply voltage of an intermediate value for application on corresponding grids of the pentode tubes 295 and 329, while direct current for energizing the field winding 309 of the generator is derived from the conductor 381 through the resistor 387 and another resistor 389 in series with the resistor 387.

The control of the entire system is accomplished by means of a control system 391 shown in the diagram Fig. 20 and comprising switches and switch operating coils arranged in circuits between the line conductors A—C. These control circuits include a circuit 393 comprising a normally open switch S-1-A, a spool-empty relay coil C-1, and a manually operable normally closed spool-empty clearing switch 395.

The control system of the tension device 53 is preferably connected in the control system 391 by means of a connector plug 397 connecting the switch blade 233 of said system with the line conductor C, the relay coil 245 and the motor field coil 257 with the line conductor A, and the conductor 237 in the circuit 393 between the switch S-1-A and the coil C-1.

The control system 391 also includes a circuit 399 comprising a pair of normally closed switches S-1-B and S-4 in series, one of said switches being connected to the line conductor A and the other being connected with a pair of branch circuits 401 and 403. The circuit 401 includes a relay switch coil C-2 under the control of the normally closed manually operable stop switch 277 which is connected to the line conductor C through the manually operable normally open start switch 275 and a normally open relay switch S-2-A in parallel with the start switch 275.

The branch circuit 403 includes a relay switch coil C-3, a normally closed switch S-2-B and the normally open manually operable job switch 279.

The control system 391 includes control circuits 405 for the gear shifting motor 47 comprising a transformer 407, the primary winding of which is connected between the line conductors A—C and the secondary of which is connected through a switch operating relay coil C-4 to one side of the motor 47. The motor 47 has left and right-hand drive connections 409 and 411 through which the same is electrically connected. The circuit 409 contains a normally closed switch S-5 and one of the limit switches 113 in the traverse mechanism, the circuit 411 containing a normally closed switch S-6 and the other traverse limit switch 114.

The control system also comprises circuits 413 comprising relay switch coils C-5 and C-6, and normally open limit switches 168 and 169 in the gear shifting mechanism.

The control system also includes a circuit 415 comprising a switch operating coil C-7 (Fig. 20) which when energized opens the normally closed switch S-7 (Fig. 22) in order to start the motor 37. The coil is connected across the line A—C in series with a pair of normally open control switches S-2-C and S-3 which close when either of the coils C-2 or C-3 are energized in the control circuits 401 and 403 by operation of the switches controlling the coils C-2 and C-3.

The stop, start and inching switches 277, 275 and 279, the clearing switch 395, and the power supply disconnect switch 418 (Fig. 20) are manually operable and preferably located on the panel 40 along with the adjustable resistors 347 and 349 (Fig. 22).

The switches S-1-A and S-1-B are relay operated by the coil C-1. The switches S-2-A, S-2-B and S-2-C are operated by the relay coil C-2. Likewise the switches S-3, S-4, S-5, S-6 and S-7 are operated respectively by the coils C-3, C-4, C-5, C-6 and C-7.

*Operation*

It will be seen from the foregoing that the apparatus operates to wind the wire 55 on the mandrel means 33 by actuating the motive means 35 in one direction, the motive means being operable in the reverse direction to unwind the wire work material from the mandrel. Operation of the driving means 35 also actuates the traverse means 41 which guides the work material as it winds upon or is wound off from the mandrel.

The wire stock material is delivered to or withdrawn from the mandrel, as rapidly as demanded by the winding or unwinding rotation of the mandrel, by virtue of the reel driving motors 51 and the associated control system shown diagrammatically in Figs. 20, 21, and 22.

Upon the closure of the start switch 275, the power supply disconnect switch 418 being closed and the stop switch 277 and switches S-1-B and S-4 being normally closed, the coil C-2 becomes energized closing switches S-2-A and S-2-C, and opening switch S-2-B.

Closure of switch S-2-A holds the coil C-2 in circuit even after the manual starting switch 275 is released.

Closure of switch S-2-C energizes coil C-7 thus opening switch S-7 and allowing the motor 37 to start, under the control of the generator and electronic systems 293 and 299.

When the traverse mechanism reaches the end of a winding stroke one or the other of switches 113 and 114 will close energizing the reversing motor 47 through the associated switch S-5 or S-6. The reversing motor will operate until one of switches 168 or 169 is closed at the conclusion of the gear shift operation, thus energizing coil C-5 or C-6 to open the corresponding switch in one of the circuits 409 or 411 thus stopping the motor 47. As soon as the gear shifting motor 47 is energized, the coil C-4 is also energized thus opening the switch S-4 and de-energizing coils C-2 and C-3 thus opening switch S-2-A, closing switch S-2-B and opening switch S-2-C to stop motor 37 by de-energizing coil C-7 and consequently allowing switch S-7 (Fig. 22) to close.

Stoppage of the mechanism at the end of each winding stroke is thus accomplished by the switches 113 and 114 which also causes the motor 47 automatically to reverse the traverse mechanism ready for the application of a successive layer in the reverse direction.

A successive layer is applied merely by pressing the start button 275 after the motor 47 has stopped through action of the coil C-7 and corresponding switches, and after the resistor 61 has been adjusted to set the mandrel speed for the application of such successive layer.

When it becomes necessary to inch the machine, the same is first stopped by opening switch 277 to de-energize coil C-2. This will ordinarily be done when the machine has wound somewhat less than the desired number of turns as shown by the indicator 59. If the machine has overrun it may be inched in reverse by throwing switch 283 to reverse motor 37.

Pressing the inching switch 279 energizes the coil C-3, the switch S-2-B being closed when coil C-2 is de-energized. The coil C-3, when thus energized by closure of switch 279, closes switch S-3, energizes coil C-7 to open switch S-7 and allow motor 37 to turn. The coil C-3, however, also operates switch 351 in the control system 299 to place the inching resistance 347 in action thus increasing negative bias on the tube 295 and causing the motor 37 to turn slowly at inching speed. The inching operation continues so long as the operator of the machine holds down the switch 279 and stops as soon as the switch is released to de-energize coil C-3, open switch S-3, de-energize coil C-7 and close switch S-7.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A winding machine comprising a sectional mandrel, motor means for turning the mandrel in one direction to wind flexible work material thereon and in the reverse direction to release work material therefrom, delivery means for applying or retracting work material to or from the mandrel at a plurality of winding zones, said delivery means comprising a motor driven reel for each zone, means controlling the speed of said reels to deliver work material therefrom under substantially constant tension at the rate demanded by the mandrel, traverse means movable progressively along the mandrel for guiding the work material thereon, and means to drive the traverse means from said motor means, including reversing means for reversing the traverse means independently of said mandrel.

2. A winding machine comprising a mandrel, motor means for driving the mandrel in one direction to wind flexible work material thereon, delivery means for applying work material on the mandrel, comprising a motor driven reel and means controlling the speed of said reel to deliver the work material under substantially constant tension at the rate demanded by said mandrel, and traverse means movable progressively along the mandrel for guiding the work material thereon in adjacent turns, counter means driven by the motor means to indicate the number of turns on the mandrel, and inching means, operable at will, to drive the mandrel at slow speed to obtain an accurate number of turns wound on the mandrel.

3. A winding machine comprising a winding mandrel, a drive motor for driving the mandrel, delivery means for feeding flexible work material to the mandrel for winding thereon, said delivery means comprising a traverse mechanism for feeding work material progressively along the mandrel in an axial direction, control means for said drive motor comprising an electrical coil, means on said traverse mechanism for changing the reactive characteristics of said coil, and means including an electrical transmission system connecting said coil to control the speed of said drive motor as a function of the change in the reactive characteristics of the coil.

4. A winding machine comprising a winding mandrel, a drive motor for driving the mandrel, delivery means for feeding flexible work material to the mandrel for winding thereon, said delivery means comprising a traverse mechanism for feeding work material progressively along the mandrel in an axial direction, control means for said drive motor comprising saturable reactance means in the power circuit of said motor for controlling motor speed in accordance with changes in the saturation of said reactance means, an electrical coil, means on said traverse mechanism and operatively associated with said coil for changing the electromagnetic characteristics of the coil as a function of the movement of said traverse mechanism, and a translation system interposed between said coil and said saturable reactance means for varying the saturation of said reactance means as a function of the change in the electrical characteristics of the coil whereby accurately to control the speed of said motor in response to movement of the traverse mechanism.

5. A winding machine comprising a winding mandrel, a motor for driving the mandrel, delivery means for feeding flexible work material to the mandrel for winding thereon, including traverse mechanism for feeding said work material progressively along the mandrel in an axial direction, control means for said motor comprising saturable reactance means in the power circuit of said motor for controlling the speed thereof in accordance with the saturation of said reactance means, an electromagnetic coil and means for changing the electromagnetic characteristics thereof as a function of the movement of said traverse mechanism, and a translation system for varying the saturation of said reactance means as a function of change in motor speed, and an alternating current generator driven by said motor and connected in said translation system and operable to alter the saturation of said reactance means as a function of motor speed whereby to maintain said motor speed constant, the constant speed control effected by said generator being applied as a control bias on an electronic tube in said translation system, the controlling action of said coil being applied as a balancing bias on said tube in order to determine, adjustably, the constant speed at which the motor is permitted to operate under the control of the generator.

6. Apparatus for reeling flexible work material at varying speed, comprising a motor for driving a flexible material storage reel, means for controlling the speed of said motor in response to variations in the demanded rate of delivery of the material comprising a resistor, progressively acting switch means electrically connected with the motor and said resistor and operable to progressively interpose said resistor in the motor circuit to vary the speed of the motor, actuating means to actuate said switch means in one direction to increase and in the reverse direction to decrease motor speed in response to demand for delivery of the material respectively at increased and decreased rates, and a quick acting switch operable in response to sudden substantial change in demanded rate of delivery to alter the effective resistance in the motor circuit independently of said progressively acting switch means.

7. Apparatus for reeling flexible work material at varying speed, comprising a motor for driving a flexible material storage reel, means for controlling the speed of said motor in response to variations in the demanded rate of delivery of the material comprising a resistor, progressively acting switch means electrically connected with the motor and said resistor and operable to progressively interpose said resistor in the motor circuit to vary the speed of the motor, actuating means to actuate said switch means in one direction to increase and in the reverse direction to decrease motor speed in response to demand for delivery of the material respectively at increased and decreased rates, and a relay operated reversing switch for said motor and a quick acting switch connected to control said relay switch and operable to reverse the motor momentarily in response to sudden substantial change in the demanded delivery rate.

8. A winding machine comprising a winding mandrel, a motor for driving the mandrel, delivery means for feeding flexible work material to the mandrel for winding thereon, including traverse mechanism for feeding said work material progressively along the mandrel in an axial direction, control means for said motor comprising saturable reactance means in the power circuit of said motor for controlling the speed thereof in accordance with the saturation of said reactance means, an electromagnetic coil and means for changing the electromagnetic characteristics thereof as a function of the movement of said traverse mechanism, and a translation system for varying the saturation of said reactance means as a function of change in motor speed, and an alternating current generator driven by said motor and connected in said translation system and operable to alter the saturation of said reactance means as a function of motor speed whereby to maintain said motor speed constant, the constant speed control effected by said generator being applied as a control bias on an electronic tube in said translation system, the controlling action of said coil being applied as a balancing bias on said tube in order to determine, adjustably, the constant speed at which the motor is permitted to operate under control of the generator, and bias control means adjustable in accordance with the increase in winding diameter of said mandrel as superposed layers of the work material are applied thereon, said bias control means serving to vary the bias applied on said tube, by said coil, and thus adjust motor speed to maintain the normal delivery of work material at a desired linear winding speed.

9. Apparatus for reeling flexible work material at varying speed, comprising a motor for driving a flexible material storage reel, speed control means for controlling the speed of said motor in response to variations in the demanded rate of delivery of the material, comprising a member movable in either direction from a neutral position to increase motor speed in response to a demand for more rapid delivery of the material, said member being movable toward said neutral position to decrease motor speed in response to demand for material delivery at lesser speed, reversing means operable upon movement of said control means in one direction from said neutral position to drive the motor in one direction and to drive the motor in the reverse direction upon movement of said control means in the opposite direction from said neutral position, and quick acting means operable, independently of said reversing means, to reverse the motor in response to sudden substantial reversal of the demanded delivery rate.

10. Apparatus for reeling flexible work material at varying speed, comprising a motor for driving a flexible material storage reel, speed control means for controlling the speed of said motor in response to variations in the demanded rate of delivery of the material, comprising a member movable in either direction from a neutral position to increase motor speed in response to a demand for more rapid delivery of the material, said member being movable toward said neutral position to decrease motor speed in response to demand for material delivery at lesser speed, reversing means operable upon movement of said control means in one direction from said neutral position to drive the motor in one direction and to drive the motor in the reverse direction upon movement of said control means in the opposite direction from said neutral position, quick acting means operable, independently of said reversing means, to reverse the motor in response to sudden substantial reversal of the demanded delivery rate, and additional quick acting means operable in response to sudden changes in the rate of material delivery demand to alter the speed of said motor independently of said speed control means.

11. A winding machine comprising means forming a mandrel, motor means for turning the mandrel to wind flexible work material thereon, delivery means for applying work material to the mandrel, said delivery means comprising a motor driven reel, speed control means controlling the speed of said reel to deliver work material therefrom under substantially constant tension at the rate demanded by the mandrel, quick acting means operable in response to sudden changes in the rate of material delivery to alter the speed of said motor driven reel, independently of said speed control means, and inching means operable at will to drive the mandrel at slow speed.

12. A winding machine comprising means forming a mandrel, motor means for driving the mandrel to wind flexible work material thereon, delivery means for applying work material on the mandrel comprising a motor for driving a work material storage reel and means for controlling the speed of said motor to deliver the work material from the reel under substantially constant tension at the rate demanded by said mandrel, traverse means movable progressively along the mandrel for guiding the work material thereon, in adjacent turns, and inching means, operable at will, to drive the mandrel at slow speed to obtain an accurate number of turns wound on the mandrel.

13. A winding machine comprising means forming a mandrel, motor means for driving the mandrel to wind flexible work material thereon, delivery means for applying work material on the mandrel comprising a motor driven storage reel and means for controlling the speed of said reel to deliver work material therefrom under substantially constant tension at the rate demanded by said mandrel, traverse means operable progressively along the mandrel for guiding the work material thereon, means for reversing said traverse means independently of said mandrel, and inching means operable at will to drive the mandrel at slow speed.

14. Apparatus for reeling flexible work material at varying speed, comprising a motor driven material storage reel, progressively acting switch means for controlling the speed of said motor driven reel in response to progressive variations in the demanded rate of material delivery, including a member drivingly connected to actuate said switch means, said member being movable progressively in response to changes in the demanded delivery rate of the material, and additional switch means drivingly connected with said member and instantaneously operable in response to sudden changes in the demanded rate of material delivery to alter the speed of said motor driven reel independently of said progressively acting switch means, including slow acting means normally biasing said additional switch means toward inactive position regardless of the position of said member.

15. Apparatus for reeling flexible work material at variable speed, comprising a motor driven material storage reel, speed control means for controlling the speed of said motor driven reel in response to variations in the demanded rate of delivery of the material, comprising progressively acting switch means movable in either direction from a neutral position to increase the speed of said motor driven reel, said switch means being movable toward said neutral position to decrease motor speed in response to demand for material delivery at decreased speed, an arm drivingly connected with said switch means and movable in response to changes in the demanded delivery rate of the material, and quick acting switch means operatively connected with said arm and operable independently of said progressively acting switch means, in response to relatively large sudden change in the demanded material delivery rate to change the speed of said motor driven reel in advance of the action of said progressively acting switch means, said quick acting means including relatively slow acting dashpot means normally biasing said quick acting switch means toward inoperative position regardless of the position of said arm.

DONALD E. HOOKER.

REFERENCES CITED

The following references are of record in the file of this patent:

UNITED STATES PATENTS

| Number | Name | Date |
|---|---|---|
| 1,844,699 | Stack | Feb. 9, 1932 |
| 1,959,680 | Livingston | May 22, 1934 |
| 1,966,214 | Palmer | July 10, 1934 |
| 1,968,343 | Lewellen | July 31, 1934 |
| 1,975,620 | Saul | Oct. 2, 1934 |
| 2,006,819 | Zschach | July 2, 1935 |
| 2,032,176 | Kovalsky | Feb. 25, 1936 |
| 2,161,459 | Demay | June 6, 1939 |
| 2,214,355 | Tiselius et al. | Sept. 10, 1940 |
| 2,214,609 | Drake | Sept. 10, 1940 |
| 2,306,157 | Edwards et al. | Dec. 22, 1942 |

FOREIGN PATENTS

| Number | Country | Date |
|---|---|---|
| 376,908 | Great Britain | July 21, 1932 |